(12) United States Patent
Andrews

(10) Patent No.: US 12,175,745 B2
(45) Date of Patent: Dec. 24, 2024

(54) COVERT SPYING DEVICE DETECTOR

(71) Applicant: Randy Alan Andrews, West Linn, OR (US)

(72) Inventor: Randy Alan Andrews, West Linn, OR (US)

( * ) Notice: Subject to any disclaimer, the term of this patent is extended or adjusted under 35 U.S.C. 154(b) by 127 days.

(21) Appl. No.: 17/227,280

(22) Filed: Apr. 10, 2021

(65) Prior Publication Data
US 2021/0329441 A1    Oct. 21, 2021

Related U.S. Application Data

(60) Provisional application No. 63/010,077, filed on Apr. 15, 2020.

(51) Int. Cl.
| | |
|---|---|
| *G06V 20/20* | (2022.01) |
| *G06F 18/21* | (2023.01) |
| *G06N 3/08* | (2023.01) |
| *G06N 20/00* | (2019.01) |
| *G06V 10/10* | (2022.01) |
| *G06V 10/44* | (2022.01) |
| *G06V 10/764* | (2022.01) |
| *G06V 20/64* | (2022.01) |
| *H04L 67/50* | (2022.01) |

(Continued)

(52) U.S. Cl.
CPC ............ *G06V 20/20* (2022.01); *G06F 18/217* (2023.01); *G06N 3/08* (2013.01); *G06N 20/00* (2019.01); *G06V 10/17* (2022.01); *G06V 10/443* (2022.01); *G06V 10/764* (2022.01); *G06V 20/64* (2022.01); *H04L 67/535* (2022.05); *H04W 8/005* (2013.01); *H04W 48/16* (2013.01); *G06F 18/2415* (2023.01)

(58) Field of Classification Search
None
See application file for complete search history.

(56) References Cited

U.S. PATENT DOCUMENTS

| | | | |
|---|---|---|---|
| 10,778,705 B1 * | 9/2020 | Park | G06F 11/327 |
| 11,075,934 B1 * | 7/2021 | Aldhaheri | G06N 3/048 |

(Continued)

OTHER PUBLICATIONS

Tian Liu, Ziyu Liu, Jun Huang, Rui Tan, Zhen Tan, "Detecting Wireless Spy Cameras Via Stimulating and Probing", Jun. 2018, MobiSys '18 Proceedings of the 16th Annual Conference on Mobile Systems, Applications and Services, pp. 243-255. (Year: 2018).*

*Primary Examiner* — Kaveh Abrishamkar

(57) ABSTRACT

A system for detection of covert spying devices. A computing device of the system is configured to receive user selections of covert spying device detection options. An image recognition process is carried out to determine whether any object detected in an image of objects being scanned resembles an already known covert spying device. A network scan process is carried out optionally or additionally to determine whether any network attribute associated with objects being scanned resembles any network attribute associated with the already known covert spying device. A monitoring process detects and logs any unauthorized access made to objects being scanned on finding any deviation in activities occurred in the objects being scanned from a standard set of activities. A report indicates any object as a suspected covert spying device on finding any resemblance with an already known covert spying device or on finding any unauthorized access.

23 Claims, 12 Drawing Sheets

(51) Int. Cl.
*H04W 8/00* (2009.01)
*H04W 48/16* (2009.01)
*G06F 18/2415* (2023.01)

(56) References Cited

U.S. PATENT DOCUMENTS

| | | | |
|---|---|---|---|
| 11,589,207 B2* | 2/2023 | Han | H04W 8/005 |
| 2013/0167238 A1* | 6/2013 | Russell | G06F 21/577 |
| | | | 726/25 |
| 2013/0305359 A1* | 11/2013 | Gathala | G06F 21/552 |
| | | | 726/22 |
| 2015/0142462 A1* | 5/2015 | Vaidya | G16H 40/63 |
| | | | 705/2 |
| 2017/0337467 A1* | 11/2017 | Kadav | G06F 18/2413 |
| 2018/0357916 A1* | 12/2018 | Breed | G09B 7/07 |

* cited by examiner

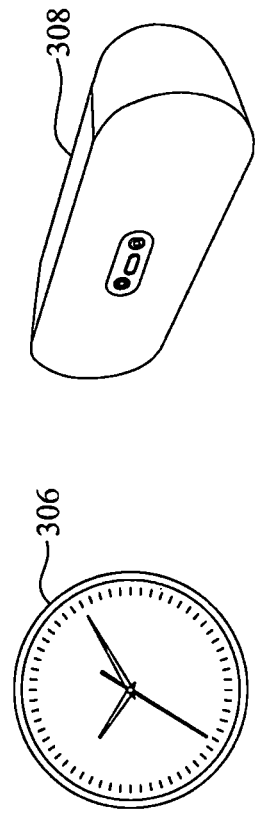
(PRIOR ART) FIG.3A
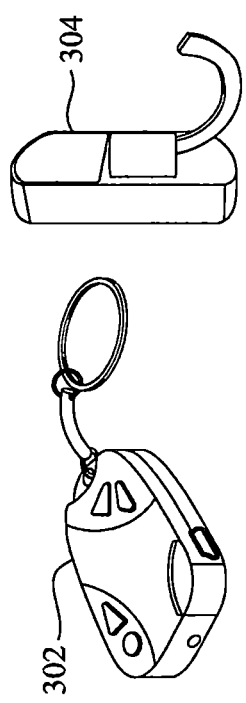
FIG.3E
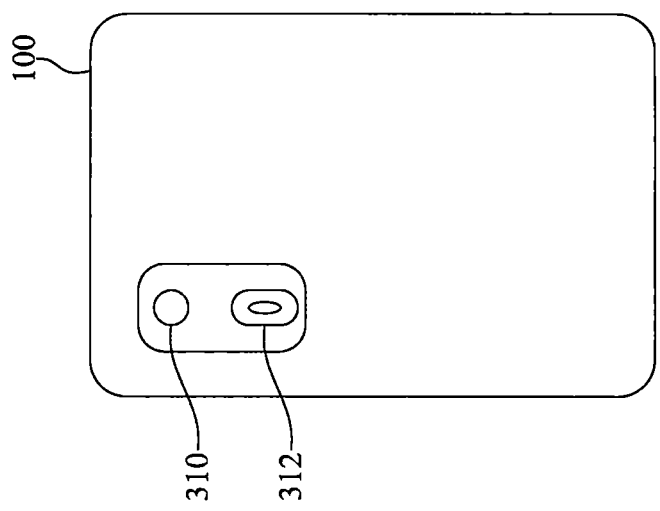
(PRIOR ART) FIG.3D
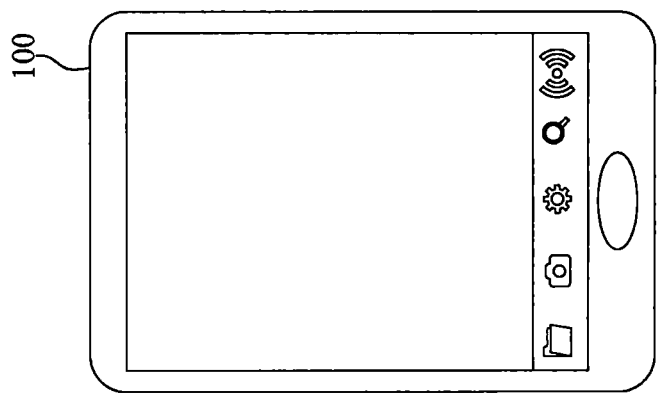
FIG.3F

COVERT SPYING DEVICE DETECTOR

CROSS-REFERENCE TO RELATED APPLICATION

This application claims the benefit of U.S. Provisional Application No. 63/010,077, filed Apr. 15, 2020 the contents of which are incorporated herein by reference.

FIELD OF THE INVENTION

The present invention relates to a method and system for detection of covert spying devices. More particularly, the present invention relates to the field of detection of hidden cameras, eavesdropping devices and unauthorized access to electronic devices.

BACKGROUND OF THE INVENTION

Technology has made surveillance devices such as cameras inexpensive and easily available. Surveillance cameras having capability to record and/or transmit still images and videos and microphones to record and transmit audio files can be found almost anywhere: on traffic signals, airport terminals, in parking lots and inside stores. While many of these uses are perfectly legitimate, problems arise when they're used for nefarious purposes. The fact that technological advancement has made it possible to make tiny, inconspicuous cameras has increased illegal use of hidden cameras and microphones. Camera designs now come disguised as other everyday objects, like keychains, pens, smoke detectors, clocks, USB hubs, even wireless chargers etc. These cameras are easily available in the market and most require no technical skills to install.

Instances of hacking and gaining unauthorized access to a network connected electronic device including to a camera installed therein are also prevalent in the world today. Although, use of covert spying devices at places where the subject would normally expect privacy is illegal, such uses are on the rise. To tackle the problem many states have enacted laws. Devices have been developed to detect hidden cameras, microphones and unauthorized access. However, the presently available devices are either very expensive or ineffective. It is always may not be practicable for an individual to carry a dedicated hidden camera detector to every place she visits.

Accordingly, there is a need for a system and method for providing solution to the aforesaid issues related to detection of covert spying devices.

OBJECTS OF THE INVENTION

It is an object of the present invention to provide a system and method for detection of covert spying devices.

Another object of the present invention is to provide an application operable in mobile phones for detecting covert spying devices.

Yet another object of the present invention is to provide a system and method for detection of unauthorized access to a device.

A further object of the present invention is to provide a system and method for integrating artificial intelligence for detection of covert spying device.

Still another object of the present invention is to provide a system with the ability to automatically learn and improve detections of covert devices.

Yet another object of the present invention is to provide a system and method for enabling monitoring and detection of covert devices with the help remotely located experts.

A further object of the present invention is to provide protection to enterprises through a system and method for detection and monitoring of covert spying devices.

These as well as other objects of the present invention are apparent upon inspection of this specification, including the drawings and appendices attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and method for detection, monitoring, logging and reporting of covert spying devices. The terms eavesdropping devices, monitoring devices, hidden cameras, hacked and compromised devices and similar spying devices are referred to hereinafter as covert spying devices. The system of the present invention for scanning, monitoring, analyzing and detecting covert spying devices comprises a computing device configured to carry out optical scanning of images/videos captured through an associated camera for detection of hidden cameras, to carry out network scanning and list the devices detected in the network as per their probability category and to carry out monitoring of activities of applications running on or accessing the computing device or an associated device. In the optical scanning the suspected objects being scanned are made visually identifiable by placing a marker over the image of the object on the user interface. In case of network scanning, option is provided for getting further information on the detected device which can help in determining their function and purpose. Monitoring of activities results in auditable information which enables detection of suspicious activities or unauthorized access made on/to the computing device.

The process of detection, monitoring, logging and reporting of covert spying devices can be carried out alone by the computing device configured to do so as per the present invention or by the computing device and a remote server or cloud server together. In case of implementation of the present invention in other than personal/individual devices, for example in enterprise solutions, a network appliance can be configured to carry out some of the tasks while another computing device can be configured to handle the major tasks.

The methods of covert spying device detection used by the present invention in various applications may include MAC address lookup of known manufacturers, port usage, combinations of ports, clear text authentication/known authentication, image recognition, network behavior, packet inspection, bandwidth usage, time, location, bandwidth and other data comparative analytics, remote IP and connection information (compared to known servers), Pier to Pier connection detection (independent and compared to known PtP servers), compare network attached and Bluetooth devices to network activity for known matches, device name or identifier coupled with bandwidth and/or data stream information, database comparison, machine learning and artificial intelligence.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIGS. 3A to 3D illustrate exemplary prior art household items which may or may not be covert devices;

FIGS. 3E and 3F illustrate exemplary view of the both sides of the mobile computing device;

DETAILED DESCRIPTION OF THE INVENTION

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures/computer architectures described herein are to be understood also to refer to functional equivalents of such structures. The present invention will now be described in detail with reference to embodiments thereof as illustrated in the accompanying drawings.

The present invention can be implemented for use by individuals and/or by enterprises, as per need. For example, for individual use the present invention can be implemented through a mobile application installed on a smartphone which may be configured to carry all the steps required for detection of covert spying devices alone or may be configured to take help of cloud based services for part of the job. For enterprise solution, a network appliance can be configured to carry out the steps with or without the help of remote servers. In some embodiments, the computing device 100 can be configured to work with the network appliance to identify, manage and disable covert programs on any device attached to the network.

Figure 1:
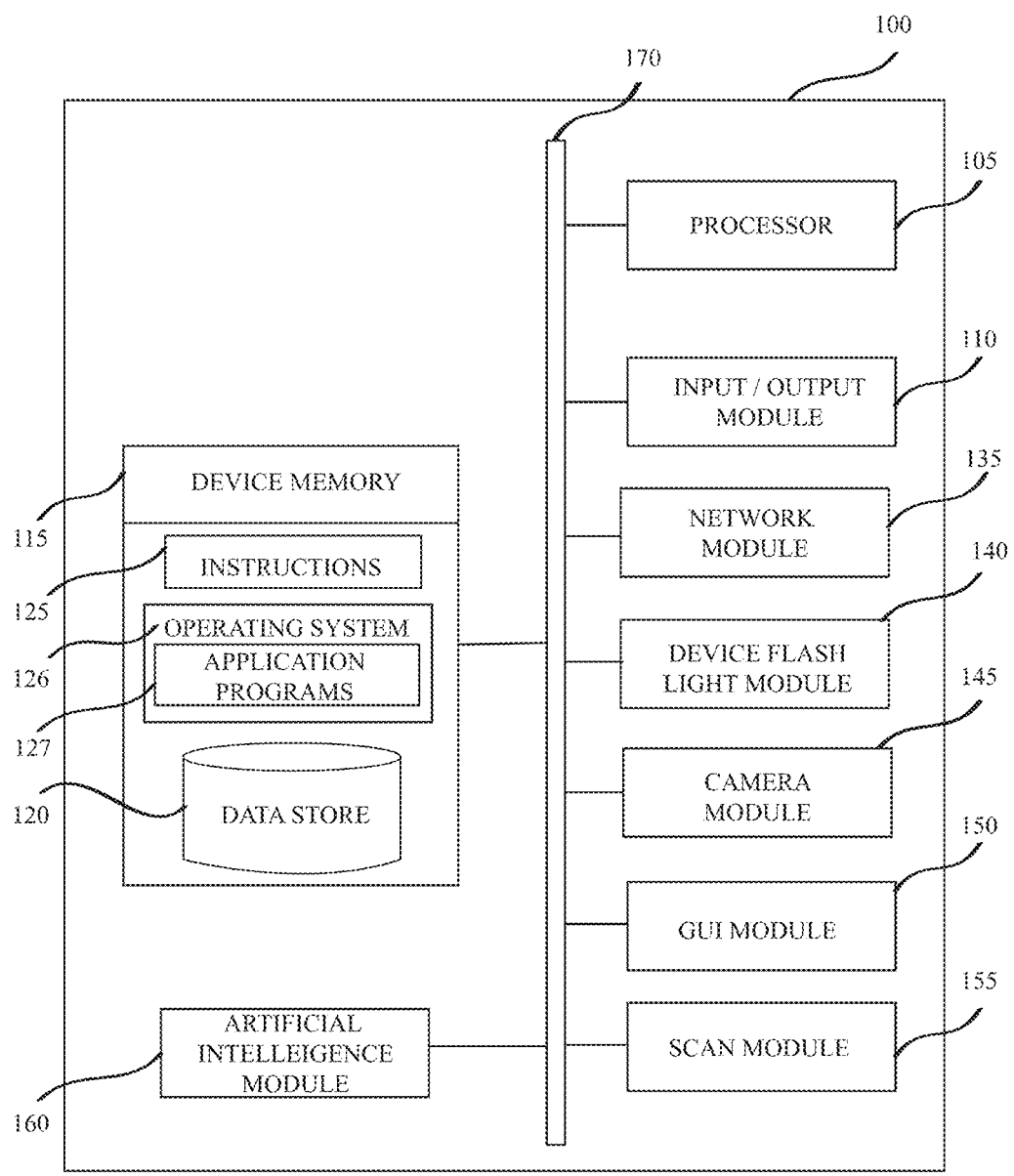
FIG. 1 illustrates a block diagram of the various components of a computing device in accordance with an embodiment of the present invention.

FIG. 1 is an illustration of exemplary components of a computing device 100 for detecting, monitoring, analyzing, logging and reporting presence of covert spying devices in an area/network being scanned/monitored in accordance with an embodiment of the present invention. Certain aspects/components shown in FIG. 1 may be embodied and/or reside at a server 1102, as will be discussed with respect to FIG. 11 below. In the present embodiment, the computing device 100 comprises a processor 105, an input/output module 110, a network module 135, a device flash light module 140, a media acquisition/camera module 145, a GUI module 150, a scan module 155, an artificial intelligence module 160 and a device memory 115. The device memory 115 may comprise any computer-readable storage media readable by the processor 105 and capable of storing software such as program instructions 125 for detection of covert spying devices. The device memory 115 may further comprise an operating system 126 and application programs 127 etc. Device memory 115 i.e. storage system may include volatile and nonvolatile, removable and non-removable media implemented in any method or technology for storage of information, such as computer-readable instructions, data structures, program modules, or other data. In the present example, the computer program instructions 125 may be a mobile application or "mobile app" that may be downloaded and operably installed in a mobile computing device using methods known in the art. This mobile app, also referred to herein as covert spying device detector app, enables a user to do various tasks related to detection, monitoring, logging, analysis and reporting of covert spying device in accordance with an embodiment of the present invention. Examples of computing device may include, but not limited to mobile devices, tablets, hand-held or laptop devices, smart phones, augmented reality devices, heads-up display devices, personal digital assistants or any other similar devices. In case of enterprise implementation of the present invention, the computing device 100 is a network appliance which can be any device that aids in the flow of information to other network-connected computing devices or is a machine that centralizes hardware, software, or services for a group of network devices.

In general, instructions 125 may, when loaded into the processor 105 and executed, transform the computing device 100 overall from a general-purpose computing system into a special-purpose computing system customized to facilitate scanning, detection, monitoring, logging, analysis and reporting of covert spying devices. Indeed, encoding instructions 125 on device memory 115 may transform the physical structure of device memory 125. The specific transformation of the physical structure may depend on various factors in different implementations of this description. Examples of such factors may include, but are not limited to, the technology used to implement the storage media of device memory 125 and whether the computer-readable storage media are characterized as primary or secondary storage. Instructions 125 may also include firmware or some other form of machine-readable processing instructions executable by the processor 105.

Examples of device memory include random access memory (RAM), read only memory (ROM), magnetic disks, optical disks, write-once-read-many disks, CDs, DVDs, flash memory, solid state memory or any other suitable storage media. Certain implementations may involve either or both virtual memory and non-virtual memory.

Instructions 125 may be implemented in program instructions and, among other functions, may, when executed by system 100 in general or by processor 105 in particular, directs device 100 or processor 105 to operate as described herein for scanning, analysis, detection, logging and reporting of covert spying devices. Instructions 125 implements components for facilitating detection, monitoring, analysis, logging and reporting of covert spying devices. Storage system may be implemented as a single storage device but may also be implemented across multiple storage devices or sub-systems co-located or distributed relative to each other. In a similar manner, the term "processor" may refer to any device or portion of a device that processes electronic data from registers and/or memory to transform that electronic data into other electronic data that may be stored in registers and/or memory. Further, processor 105 may be comprised of a single processor or multiple processors. Processor 105 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

Figure 11:
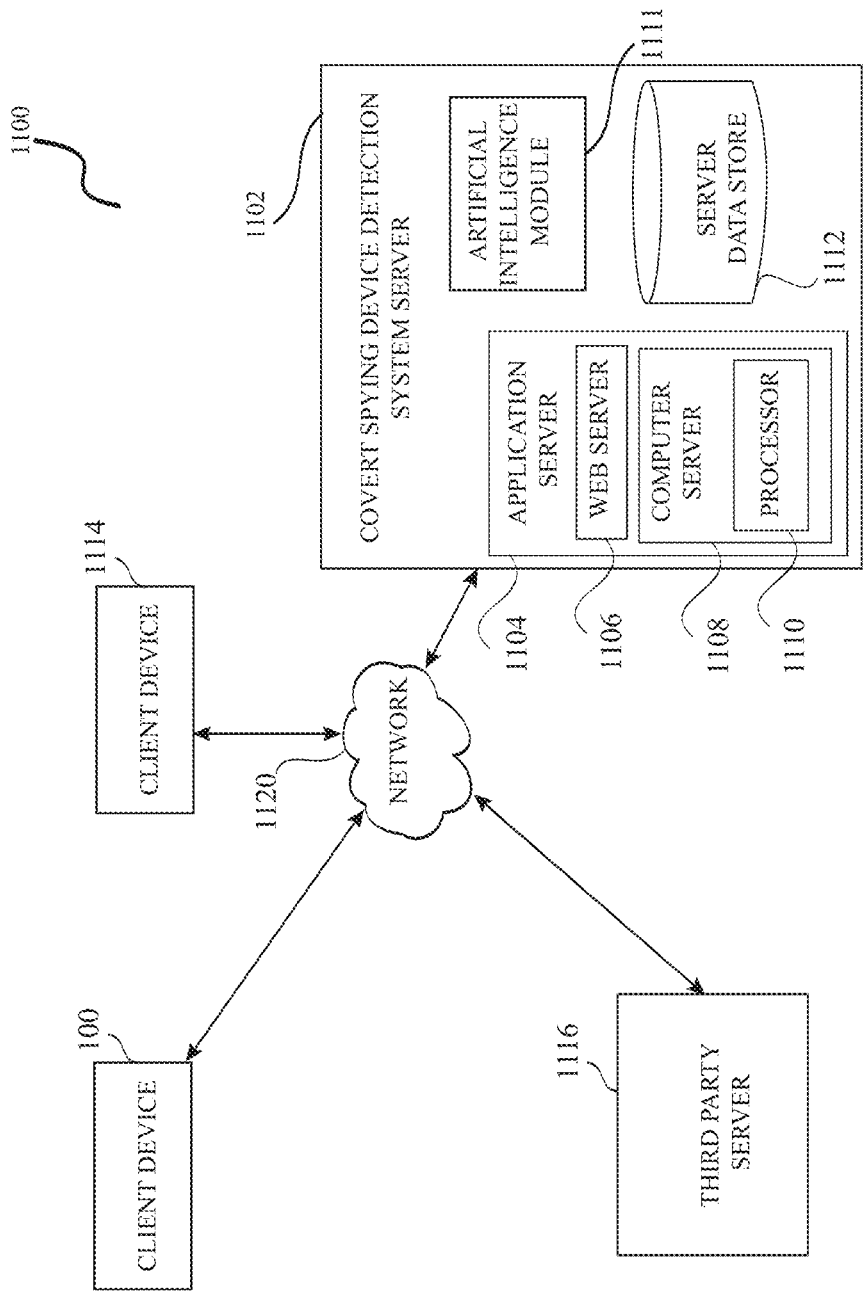
FIG. 11 illustrates a general architecture of a covert spying device detection system in accordance with a an embodiment of the present invention.

The network module 135 may enable communication between one or more devices. In a non-limiting, a network module 135 may enable communication between a computing device 100, remote servers such as 1102 and 1116, and with one or more devices such as 1114 available in a network 1120 as shown in FIG. 11. In a non-limiting example communication may be audio, video, image, textual data or instructional data transferred over the network such as is necessary for detection of covert spying devices etc. Network module 135 includes applications that can communicate with cloud environment, consistent with disclosed embodiments. For example, network module 135 can include applications invoking applications running in cloud environment, provide data or instructions to applications running in cloud environment, or receive results from applications running in cloud environment.

In the present embodiment, computing device 100 may comprise a camera module 145 capable of capturing still image and video and a device flash light module 140 capable of flashing light (continuously on light or intermittent flashing, as required) in sync with the operation of the camera module 145, as required. Camera module 145 enables video/image produced or captured by user to be recorded, processed and communicated by processor 105. The computing device 100 may use a GUI module 150 to provide the user interface on the client device. The aforementioned components of the computing device 100 may communicate in a unidirectional manner or a bi-directional manner with each other via a communication channel 170. Communication channel 170 may be configured as a single communication channel or a multiplicity of communication channels.

The GUI module 150 enables a user to view the operation of the computer operating system and software. Processor 105 may be coupled to an input/output module 110 which can include a pointing device and keyboard, among others. Non-limiting examples of pointing device include computer mouse, trackball and touchpad/touchscreen. The input/output module 110 enables the mobile computing device to receive an operation signal with respect to the hidden camera detection function given by a user for performing a detection function or a stop command for stopping the detection function.

Wireless devices such as WIFI and Bluetooth cameras or microphones periodically broadcast messages that indicate their presence or participation in a network. The present invention can identify these messages and extract relevant meta-data and other vital information to detect and categorize wireless devices which are running on a network. The scan module 155 of the computing device 100 is configured to carry out scanning for detection of such wireless covert spying devices.

In one embodiment, the present invention uses artificial intelligence technologies such as machine learning and/or deep learning for detection of covert spying devices. The technologies such as machine learning and deep learning are implemented through neural networks which are either a system software or hardware that works similar to the tasks performed by neurons of human brain. In deep learning, a Convolutional Neural Network (CNN, or ConvNet), which is a class of deep neural networks, is applied to analyze visual imagery obtained from the media acquisition module 145. A CNN is a deep learning algorithm which can take in an input image, assign importance (learnable weights and biases) to various aspects/objects in the image and be able to differentiate one from the other. This model can be implemented using a programming language such as Python with one or more associated libraries. Examples of artificial intelligence library to create large-scale neural networks with many layers may include TensorFlow which is an open source library created for Python. TensorFlow compiles many different algorithms and models together, enabling the user to implement deep neural networks for use in image recognition/classification. Another example of open-source neural-network library is Keras, a high-level API (application programming interface) that can use TensorFlow's functions underneath. Keras makes implementing the many powerful but often complex functions of TensorFlow as simple as possible, and it's configured to work with Python without any major modifications or configuration.

In one preferred embodiment, the use of artificial intelligence can be implemented in two ways—by having the covert spying device detection app operably installed in the computing device (e.g., mobile computing device 100) and thereby using the computing device 100 to perform part or all of the analysis through a resident trained neural network (e.g. by the artificial intelligence module 160) or by having the covert spying detection app installed in the computing device 100 and then letting it communicate with a cloud service (e.g. by communicating with server 1102 of FIG. 11) to get the analysis, fully or partially, done by a remote artificial intelligence unit (e.g. by artificial intelligence module 1111 of FIG. 11).

Figure 2:
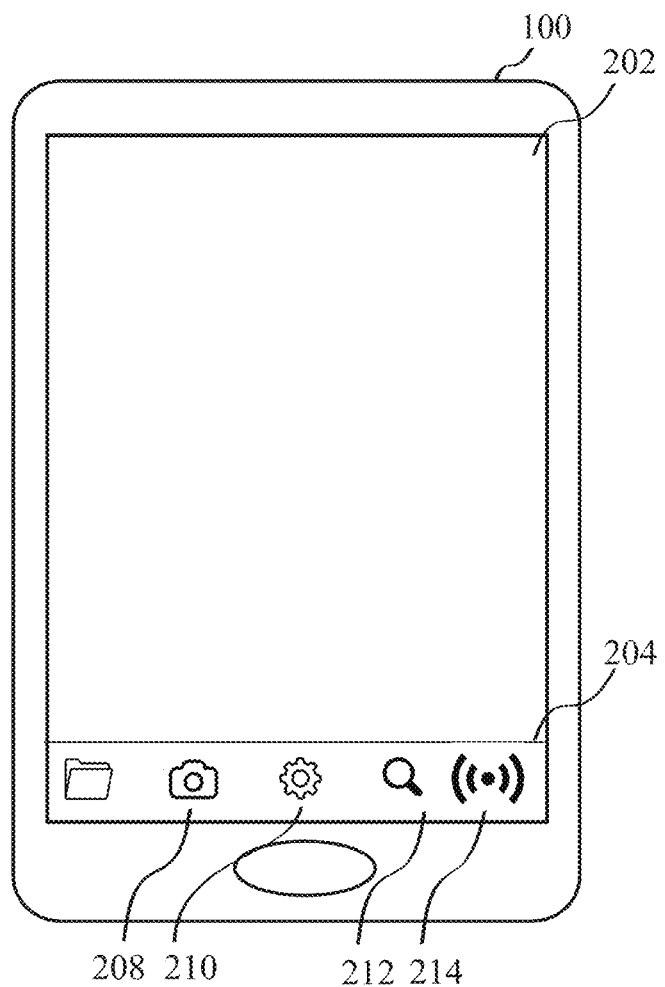
FIG. 2 illustrates an exemplary screenshot of a user interface provided on the computing device showing various options in accordance with an embodiment of the present invention.
Figure 12:
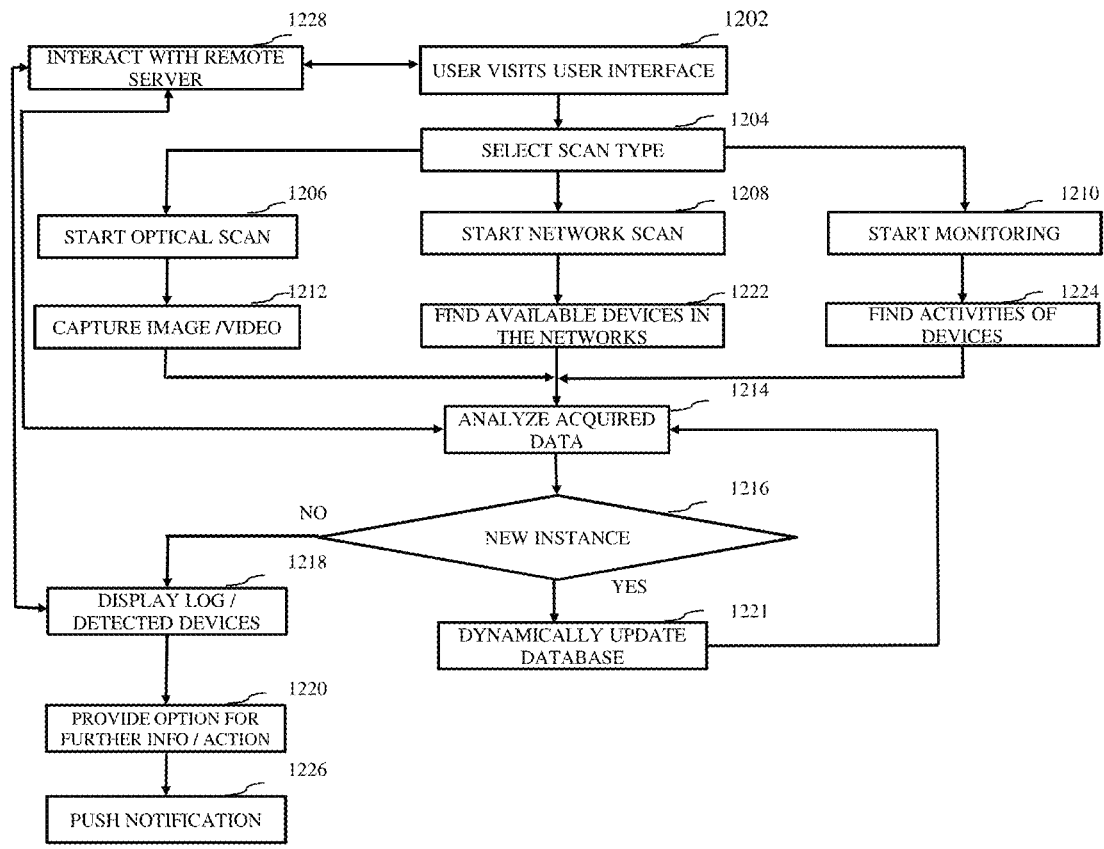
FIG. 12 is a flow diagram illustrating a method for detection of covert devices in accordance with an embodiment of the present invention.

FIG. 2 illustrates a user interface provided on a mobile computing device 100 by the present invention. A user may visit the user interface 202 on the device 100 as in step 1202 as shown in FIG. 12 to start a task related to detection of a covert spying device. Present invention offers the user a plurality of user selectable covert spying device detection options on the task bar 204 displayed on the user interface 202, as in step 1204, to carry out the detection process. For example, the scanning options may include media acquisition option 208, settings option 210, optical scanning option 212, as in step 1206, for pinhole lens detection and network scanning option 214 as in step 1208. The user interface may provide another monitoring option, as in step 1210, to begin monitoring of activities of the applications installed on the computing device 100 and/or those accessing the device 100 and/or on other objects/devices being monitored/scanned.

FIGS. 3A to 3D illustrate some common household objects which may or may not be covert spying devices. On selection of button 212, the computing device starts the optical scanning to detect hidden cameras. In a preferred embodiment, the flash light 310 (as shown in FIG. 3F) is activated in sync with the operation of the camera 312 by the device flash light module 140. The media acquisition module 145 captures still image and/or video of the objects which come across the field of view of the camera 312. The reflections of the objects lying in the field of view of the camera 312 created by the flash light 310 is captured by the camera module 145 as in step 1212. In another embodiment, the optical detection can be carried out by the present invention without flashing of the lights also.

Figure 4:
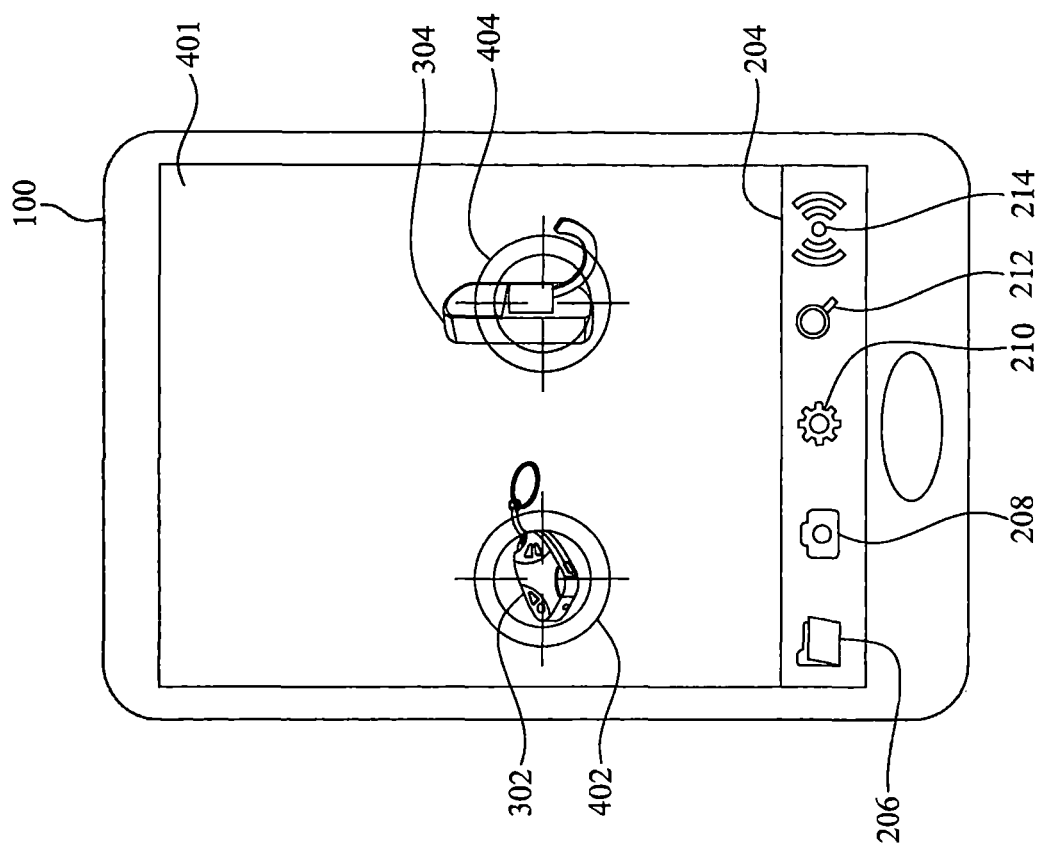
FIGS. 4 and 5 illustrate exemplary screen shots of the user interface showing scanning of covert spying devices in action in accordance with an embodiment of the present invention.
Figure 5:
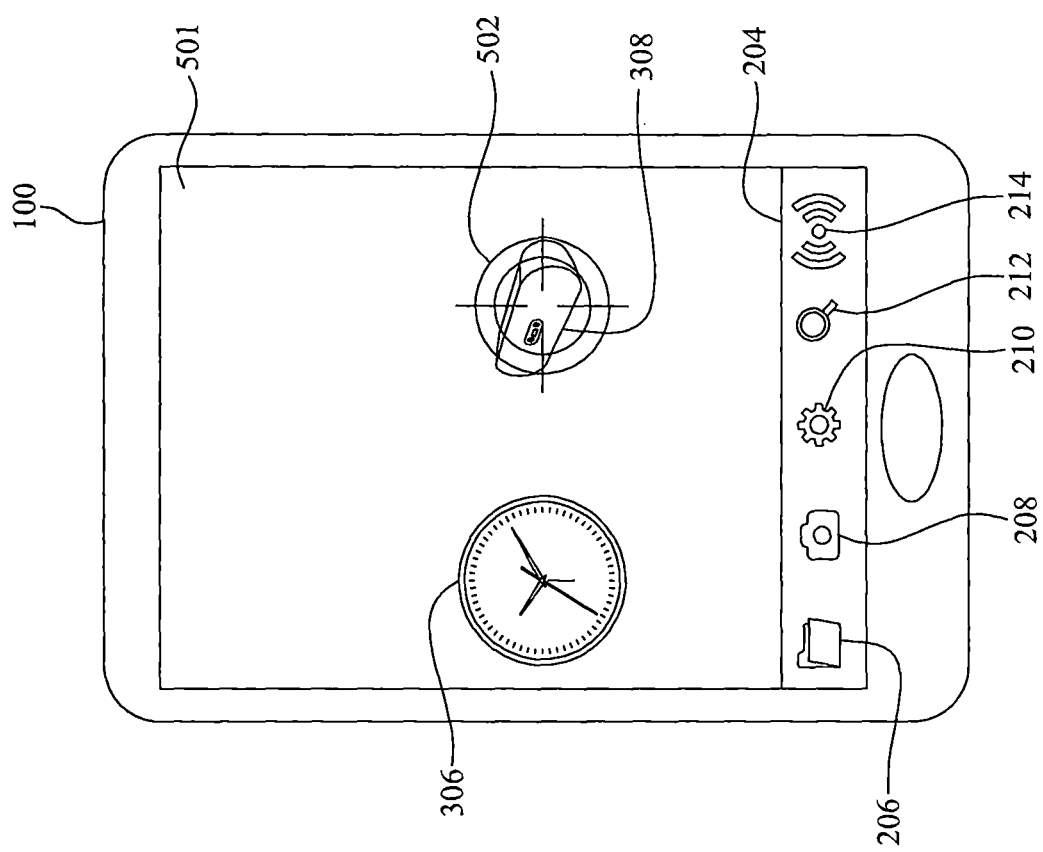

Reference to FIGS. 4, 5 and 12, on carrying out analysis/image recognition process by the computing device 100, as in step 1214, if it is found that an object resembles an already known image of a covert spying device, as in step 1216, the computing device 100 gives a report with an indication to the user for identification of the suspected covert spying device, as in step 1218. Image recognition involves both finding of resemblance of any scanned object with an already known covert spying device and finding of any reflection from a lens that resembles reflection of a covert spying device camera lens. For example, as shown in the user interface 401 of device 100 in FIG. 4, the GUI module 150 may augment/superimpose a crosshair on the user interface 401 over the suspected object as in step 1218 as an indicator in the report. Different indications can be given to the user for identification of suspected covert devices as per the degree of probability. For example, indications can be of different colors, different shapes, steady or blinking etc. to help the user distinguish a more suspicious covert spying device from a less suspicious one. Accordingly, if the object 302 is found less likely to be a covert camera than object 304, the color of crosshair 402 superimposed on the object 302 can be blue and crosshair 404 superimposed on object 304 can be red in color. In some instances, the indication can be given for only suspected covert spying objects and not for other objects being scanned. In FIG. 5, the present invention has not found object 306 to be suspicious and, hence, no indication is given for this object whereas crosshair 502 is superimposed over object 308 on the user interface 501 which the computing device has found to be suspicious.

While analyzing the visual imagery, as in step 1214, image recognition process is carried out in real time by the artificial intelligence module (module 160 of FIG. 1 and/or module 1111 of FIG. 11) for identifying and detecting objects found in the digital images acquired through the media acquisition module or camera module 145. The artificial intelligence module analyzes the acquired images and looks for objects based on many factors including size, shape, color etc. of the objects found in the images. Any reflection received from a pinhole spy camera lens also gets detected by the artificial intelligence module. The image recognition steps adopted by the present invention may include preparation of the training data (for example, labeling of real pinhole camera in reflections as true and false pinhole camera as false), creating the deep learning model, training the model (i.e. fit the model to the training data) and evaluation of model accuracy on a test validation dataset of images. A user is also allowed to submit images/videos for this process. The Convolutional Neural Network (CNN) can be used to detect the presence of pinhole cameras in the acquired images/videos.

The CNN can also be expanded to be used for Image Classification, to classify the object as a certain type of camera object or as a non-camera object (e.g. GPS Tracker, listening device, etc.). In order to carry out image recognition/classification, the neural network must carry out feature extraction. Features are the elements of the data which will be fed through the network. In the specific case of image recognition, the features are the groups of pixels, like edges and points, of an object that the network will analyze for patterns. The CNN can be trained with the comparative database images in order to label new images taken by users as a specific type of camera, as in step 1216, and provide the user with the exact camera model. The CNN will store and update, as in step 1221, the image patterns in the database 120 and/or 1112 (of FIG. 11) dynamically for each type of known camera and compare the patterns of the current image for classification. If the exact match isn't found, the CNN can return the top 5 (or so) most similar matches, for example, as in step 1218.

In some embodiments, when a potential object is detected, like a smoke detector, the user interface provides the option for the user to browse information about how to determine if it is a covert device, images of normal and spy camera smoke detectors, an option to email an image for AI analysis and/or human inspection and second opinion.

Figure 6:
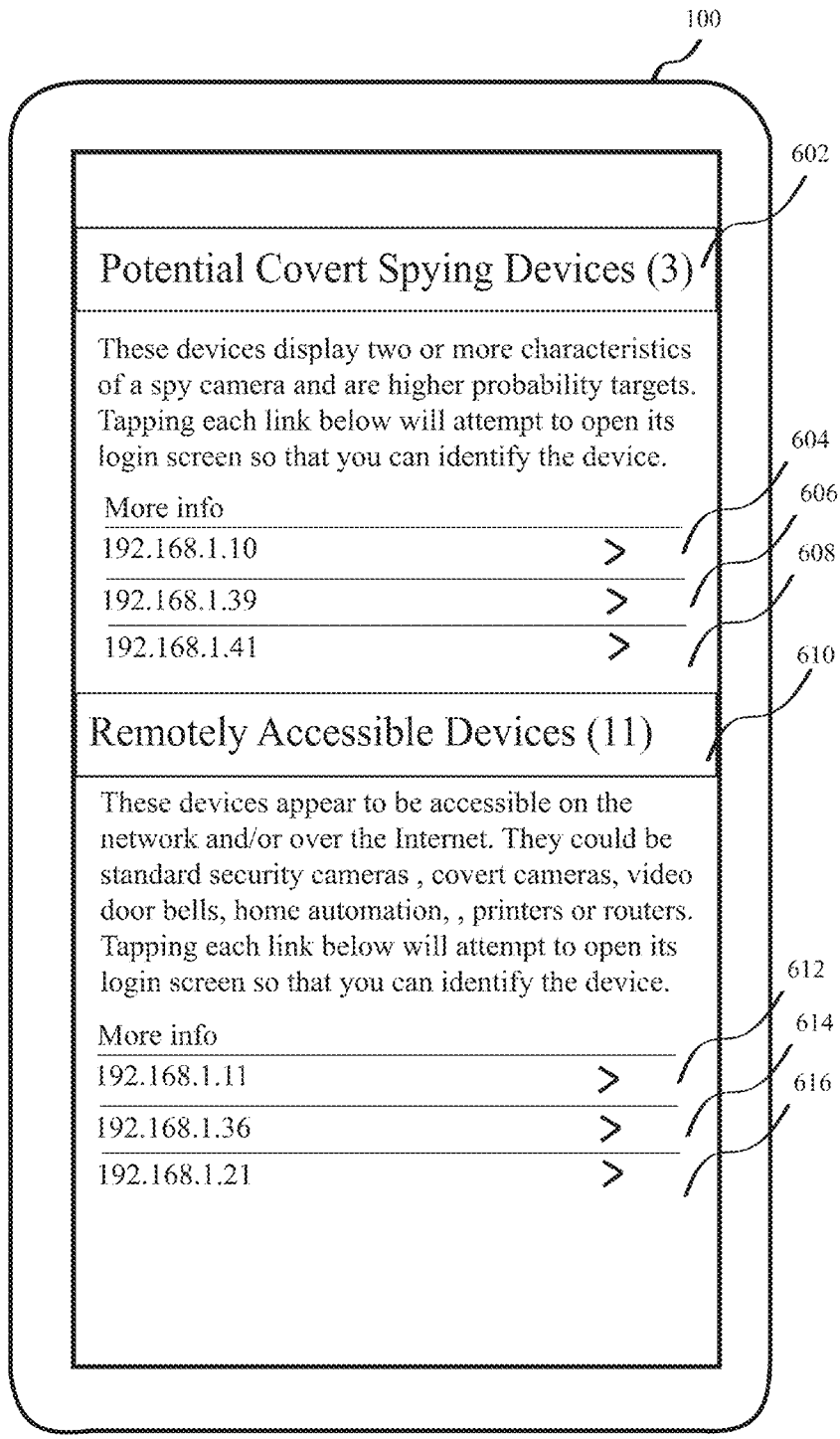
FIG. 6 illustrates an exemplary screenshot of the user interface displaying categorized results of network scan in accordance with an embodiment of the present invention.

Reference to FIGS. 4 and 6, pressing of button 214 on the user interface of the computing device 100 activates the network scanning process/mode of the present invention as in step 1208 to find out one or more network attributes associated with objects present around the computing device 100 and are connected with any network. For WIFI detection, as in step 1222, the scan module 155 scans WIFI frequency bands and may identify network attributes/information such as unique ID, which can be an auto-generated numeric identifier, timestamp i.e. time/date of the measurement, MAC i.e. source MAC address of the device, RSSI i.e. the signal strength of the device, vendor details and AP—the SSID or network to which the device is associated. For Bluetooth Scanning by the scan module 155, which is done in a similar way, the network attributes/information may include the COD (Class of Device) that indicates the type of Bluetooth device (i.e. Phone, Handsfree, etc.).

The network scanning data can be used for detection of hidden/covert wireless spying devices such as cameras & microphones (audio bugs) directly or to support, enhance or reinforce data sources derived through other means. The combination of image detection and network detection can work together and complement each other to find a covert spying device. Based on resemblance of one or more network attributes/characteristics of scanned objects, which have been identified as suspected spying devices after the image recognition scan process, with that of already known covert spying devices the artificial intelligence module reports the objects under different categories as per their probability of being covert spying devices. The artificial intelligence module enables a user to obtain additional information on the objects included in the report as suspected covert spying devices for further evaluation and verification. For example, if the optical scan finds a suspicious device which is also detected in the network scan, the system can find and forward the device's login screen to the user. In the present example, details of the devices found in the network scan are presented to the user in easily identifiable categories as per the scanned devices' probability of being a covert spying device as shown in FIG. 6. The devices for which the artificial intelligence module determines more number of indicators of being covert spying devices are put under a category distinguishable from a group of less probable devices. For example, in FIG. 6, the highly probable covert spying devices (such as 604, 606, 608 etc.) are listed under the category 602 which can be made distinguishable from the category 610 for the rest of devices (such as 612, 614, 616 etc.) found in the scan by making the categories look different from each other (e.g. higher probability category in red color, rest in yellow color etc.).

The network scanning option not only detects presence of covert spying devices in a network but also identifies if the computing device itself or any other object/device being monitored is hacked or illegally/unauthorizedly accessed/compromised making it a covert spying device. For example, if a previously benign device attached to a network is hacked then that device would effectively show up as a covert spying device in the list of highly probable covert spying devices presented on the user interface as described above. Similarly, with the present invention, hacking of camera or microphone installed in any devices such as desktop computers, laptops, smart televisions, smart glasses (including Augmented Reality glasses or Heads-up Displays), video assistant devices like Alexa Show and Google Nest Hub can be detected.

The present invention enables a user to get further information on the suspected covert spying devices as in step 1220. For example, each of the suspected covert spying devices listed in the categories can be hyperlinked so that clicking on any of them leads a user to another page on the user interface having details of the suspected covert spying devices as found by the computing device itself or in association with one or more remote servers 1102 and/or third party server 1116 as shown in FIG. 11.

Figure 7:
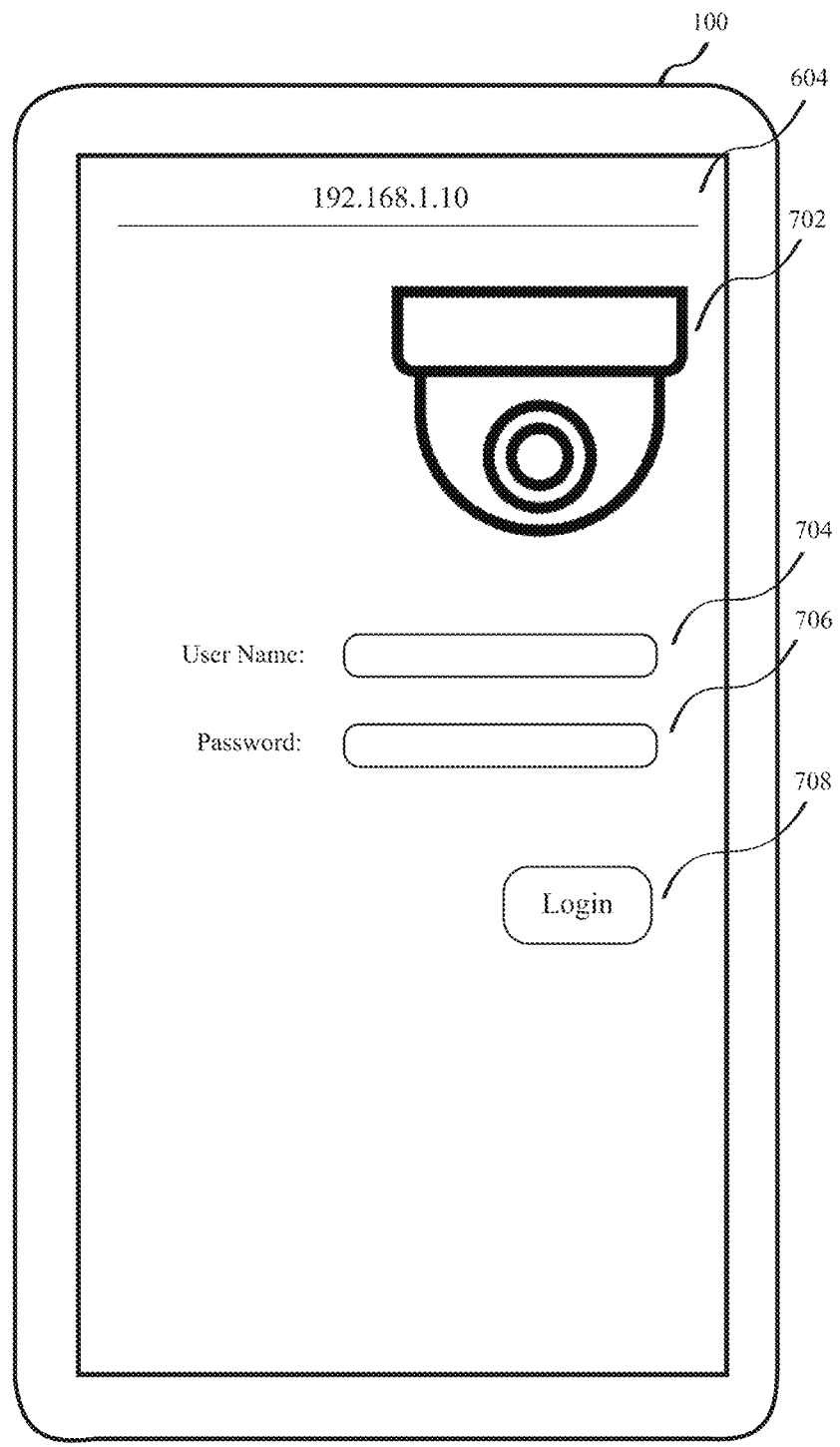
FIG. 7 illustrates an exemplary screenshot of details of a device presented on the user interface upon clicking of a link of the device detected in network scan in accordance with an embodiment of the present invention.

FIG. 7 illustrates details of one of such potential covert spying devices 604 as displayed on the user interface upon clicking of the corresponding link for the device presented on the user interface shown in FIG. 6. The page having the details of the potential covert spying devices to which the link leads to can be the login page for the device as shown in FIG. 7. For example, the information found on the login page for the scanned device 604 as shown in FIG. 7 can comprise a representative image 702 of the device, option for login user ID 704, login password 706 and login button 708 etc. and it can be determined from these details that device 604 found in the network scan is indeed a camera.

Figure 8:
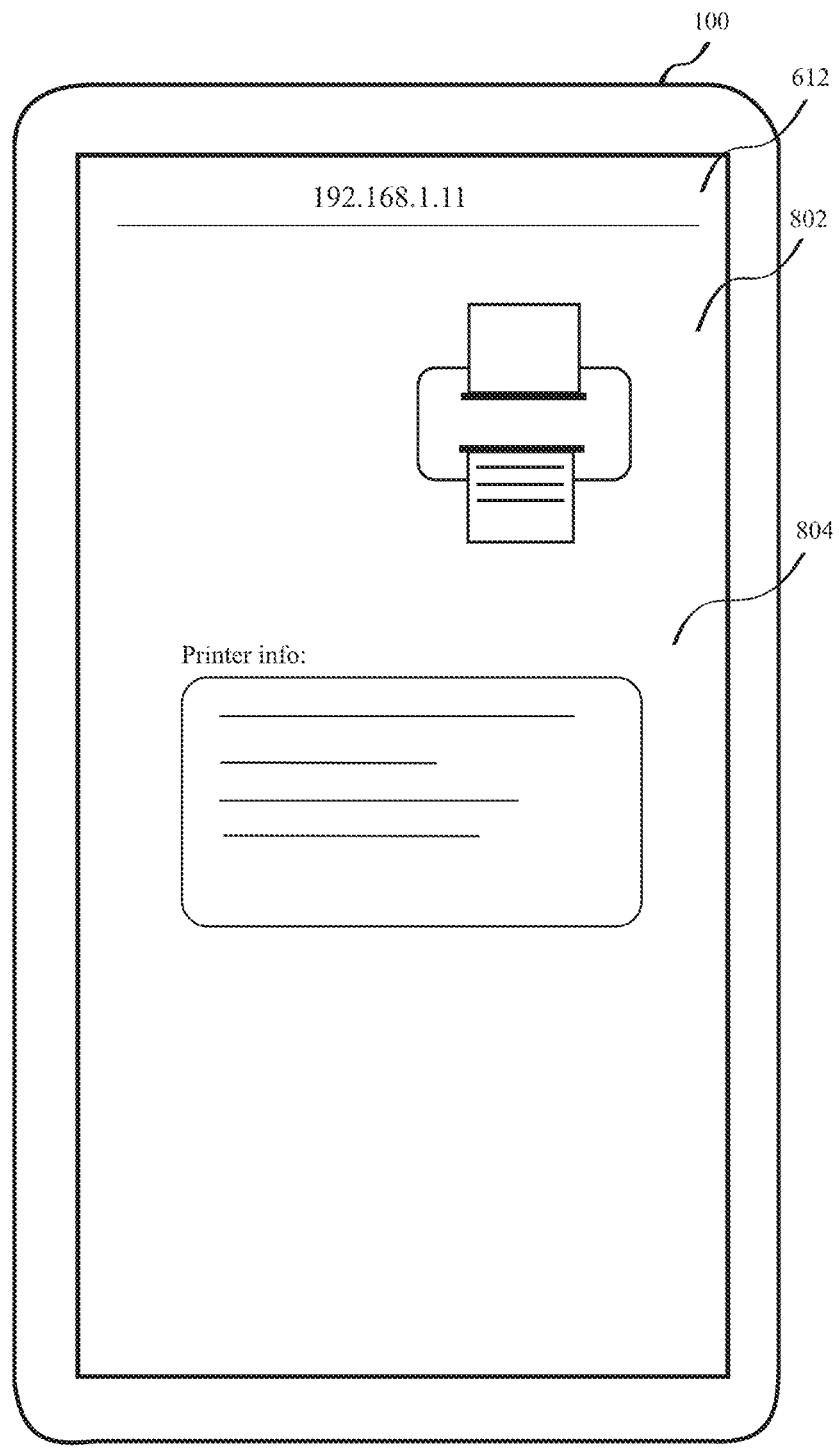
FIG. 8 illustrates another exemplary screenshot of details of a device presented on the user interface upon clicking of a link of the device detected in network scan in accordance with an embodiment of the present invention.
Figure 9:
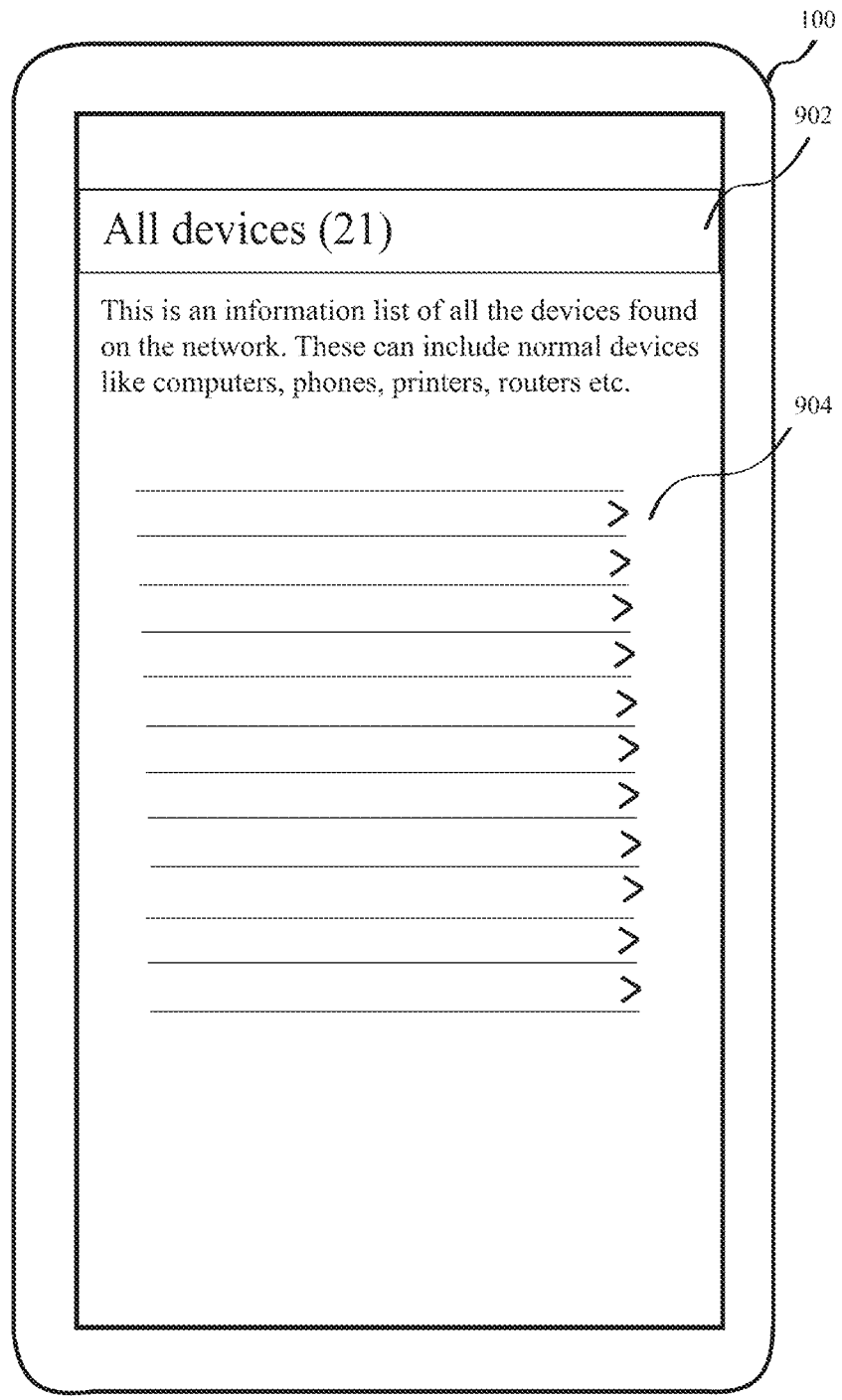
FIG. 9 illustrates an exemplary screenshot of the user interface displaying a consolidated list of the devices identified as non-spying devices in the network scanning in accordance with an embodiment of the present invention.
Figure 10:
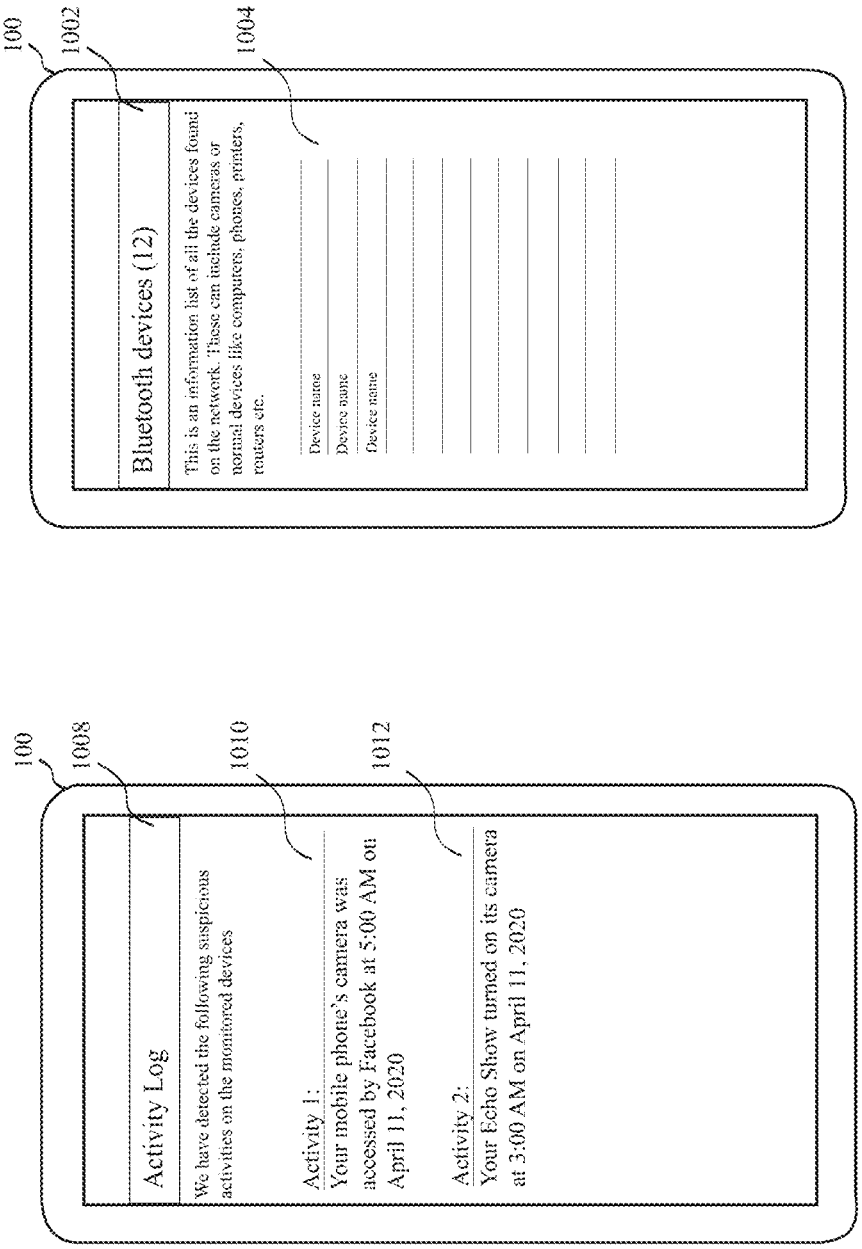
FIG. 10A illustrates an exemplary screenshot of the user interface displaying a list of the Bluetooth devices scanned in accordance with an embodiment of the present invention.
FIG. 10B illustrates an exemplary screenshot of the user interface displaying an activity log in accordance with an embodiment of the present invention.

As another example, the landing page for the hyperlink for the less likely covert spying device 612 is shown in FIG. 8. As can be seen from the details 802 and 804, the suspected device is actually a printer and not a camera or any other spying device. FIG. 9 illustrates display list 902 of all those devices (such as 904) found in the network scan which are determined to be non-spying devices by the artificial intelligence module. The devices discovered in the Bluetooth scan carried out by the scan module 155 can be listed under a separate category as shown in FIG. 10A. The information displayed for the Bluetooth devices 1002 found in the proximity of the computing device 100 may include the class of the device and the device name 1004 etc.

The present invention also enables detection and logging of all the programs installed on, running in or accessing an electronic device. Upon activation of the monitoring mode, as in step 1210, the processor 105 executes the appropriate steps to find all such activities happening in the device 100 and/or in the objects being monitored as in step 1224. The artificial intelligence module processes the acquired data as in step 1214 to monitor and compare the applications/their activities running/accessed in the objects/devices to determine any deviation in such activities from a standard/routine/normal/defined set of activities and constantly updates the database (database 120 and/or 1112) as in step 1221 on finding new instances as in step 1216. For example, the activities of the camera or the microphone of the computing device 100 can be monitored and logged even when the user is not using the camera or the microphone. Analysis of the acquired data involves comparing activities/active applications to a constantly updated database, monitoring the hardware usage of the camera/microphone of the computing device, comparing outgoing data usage with known audio/video streaming parameters etc. The monitored activities can be presented to the user in the report for auditing as in step 1218, as required using one or more indicators. For example, if the camera of the computing device 100 is detected to have been active during a period when the user was sleeping then such a data can be useful in finding illegal/unauthorized access to the camera. In such an instance, as shown in FIG. 10B, the activity log 1008 on the user interface can present a textual/audible message as an indicator, for example message 1010, "Your mobile phone's camera was accessed by Facebook at 5:00 AM on Apr. 11, 2020". In another example, a suspicious activity detected by the system on a user's Echo Show device may be presented on the activity log 1008 as a message 1012 to show "Your Echo Show turned on its camera at 3:00 AM on Apr. 11, 2020".

The artificial intelligence module uses machine learning intrusion detection techniques to monitor network behavior and detect suspicious activity if a camera or a microphone has been hi-jacked. The artificial intelligence module dynamically monitors events occurring in the computer system or in the network, analyze them for signs of possible incidents and even interdicts unauthorized access. The Machine Learning algorithms are trained on existing network data when there have been known camera or other media acquisition device hi-jacking events in order to more accurately detect the hi-jacks. It can then be run on real-time network data in order to detect hi-jacking events. Potential Machine Learning algorithms that might be useful for this intrusion detection are Deep Learning with Artificial Neural Networks (ANN) (similar to the CNN described above) with Python TensorFlow and Keras libraries, Support Vector Machines with the Python Scikit-Learn library and K-Means Clustering with the Python Scikit-Learn library among others.

The process of monitoring, analysis, detection and logging of the present invention may happen under at least partial control and/or in communication with a remote server as in step 1228. A block diagram depicting covert spying device detection system 1100 in a conventional client/server architecture in FIG. 11. The computing device 100 may be utilized to capture the image/video, scan the network, monitor the activities in the device itself or in an associated device, transmit the data to the server 1102, and receive/display any useful feedback, while the bulk of the analysis (including image recognition, network evaluation and monitoring with the neural network) may be done by the remote server 1102. This system can be more suitable for enterprise solutions wherein a network appliance is configured to play the role of the computing device 100 in whole or in parts.

Reference to FIG. 11, the covert spying device detection system server 1102 communicates with the client devices (i.e. computing devices) 100 and 1114 over the network 1120. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 1120 of FIG. 11 is for descriptive purposes only and it may be wired or wireless. Although, the description may refer to terms commonly used in describing particular public networks such as the Internet, the description and concepts equally apply to other public and private computer networks, including systems having architectures dissimilar to that shown in FIG. 11. The inventive idea of the present invention is applicable for all existing cellular network topologies or respective communication standards, in particular GSM, UMTS/HSPA, LTE and future standards.

With respect to the present description, the covert spying device detection system server 1102 may include any service that relies on a database system that is accessible over a network, in which various elements of hardware and software of the database system may be shared by one or more users of the system 1100. The graphical user interface (GUI) or user interface provided by the covert spying device detection system server 1102 on the client devices through a web browser or mobile app may be utilized for signing up, logging in, activating optical and network scanning, starting activity monitoring, interacting with the server 1102 or third party server 1116 and for presenting results/information etc.

The components appearing in the covert spying device detection system server 1102 refer to an exemplary combination of those components that would need to be assembled to create the infrastructure in order to provide the tools and services contemplated by the present invention.

The covert spying device detection system server 1102 includes an application server or executing unit 1104 and a data store 1112. The application server or executing unit 1104 comprises a web server 1106 and a computer server 1108 that serves as the application layer of the present invention. The computer server 1108 may comprise one or more physical processors 1110. It would be obvious to any person skilled in the art that, although described herein as the data being stored in a single database, different separate databases can also store the various data used by the artificial intelligence module 160 or 1111. The data store 1112 is or includes a non-transitory computer-readable storage medium. The data store 1112 may be embodied in many forms, such as a hard disk drive, a magnetic disk drive, an optical disk drive, a tape drive, or another type of computer readable media which can store data that are accessible by the processor 1110. The data store 1112 may store computer program instructions to operate the covert spying device detection system server 1102.

The Web server 1106 is a system that sends out Web pages containing electronic data files in response to Hypertext Transfer Protocol (HTTP) requests or similar protocol requests from remote browsers (i.e. browsers installed in the client devices) or in response to similar requests made through a mobile app or mobile application of the present invention installed on a client device (including a network appliance). The web server 1106 can communicate with the mobile app of the present invention, with a firmware or software installed on a network appliance and/or with a web browser installed on a client device 100 and 1114 to provide the user interface required for the interactive synchronized transcription system 100. Every client device may comprise a processor (not shown in the figures) and this processor is configured to execute one or more instructions stored in a computer readable storage medium included in the client device.

Although, the description of the covert spying detection server system 1102 may refer to terms commonly used in describing particular computer servers, the description and concepts equally apply to other processing systems, including systems having architectures dissimilar to that shown in FIG. 1. The computing infrastructure of server 1102 can be physical (bare metal), virtual, or a mix of the two depending on use case.

The data (the suspected devices/objects name, web page, physical attributes, network behavior, format and activities of applications etc., for example) acquired by the computing device 100 can be analyzed by the computing device itself and/or it can do so in association with the remote server 1102 as in step 1214. In some embodiments, the user interface on computing device 100 may give the option to the user for submitting the data to the remote server 1102 for further analysis. For example, if the user suspects the object being scanned is a covert device based on its web page or other interface but is unsure, the acquired data can be submitted for further analysis to the remote server 1102. The remote server 1102 then carries out the data analysis with the help of artificial intelligence module 1111 and sends the feedback/result to the client device 100. The remote server 1102 can also take help of other third party server 1116 for carrying out the analysis. The third party server may help the remote server 1102 or the computing device 100 with third party APIs like Vision AI, Derive Image Insights via ML, Cloud Vision API etc.

In another embodiment, the present invention enables a user to take assistance of remotely located experts for identifying covert spying devices in real time. For example, reference to FIG. 11, the user interface provided by the present invention on the client device 100 enables its user to send an image or a video of a suspected spying device or make an audio/video call or chat or live stream an inspection of a suspected object to a remotely located human experts. Taking help of the comparative database and artificial intelligence provided by the server 1102 and/or by any third party server 1116 the expert can communicate with the user through another client device 1114 to assist the user in finding covert spying devices. For any covert device not already known, the human experts and/or the artificial intelligence module analyze, evaluate and identify the covert spying device and the details of the same are added to the server data store 1112 for known interfaces.

The present invention also enables push notification for scanning results or alerts as in step 1226 of FIG. 12. For example, a smartphone configured as per the present invention can send notification to another computing device if it detects a suspicious device during a scan. In case of enterprise implementation of the present invention, a network appliance can be configured to send similar notifications.

As disclosed herein, the artificial intelligence module uses an iterative learning process that may be utilized for training. For example, training images of covert spying devices may be presented to the artificial intelligence module one at a time, and the weights associated with the input values may be adjusted. After all training images are presented, the process may be repeated to refine the neural network training. During this learning phase, the network may be trained by adjusting the weights to predict the correct categories of input images in terms of their probability of being covert spying devices.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

What is claimed is:

1. A system for detection of covert spying devices, said system comprising: a computing device comprising at least one artificial intelligence module and at least one processor, said at least one processor programmed with computer program instructions that, when executed by said processor, program said computing device to:
   A) receive one or more user selections of covert spying device detection options from a plurality of user selectable covert spying device detection options, said plurality of user selectable covert spying device detection options include an optical scan option, a network scan option and a monitoring option;
   B) carry out an image recognition process, in response to receiving said optical scan option as said one or more user selections, by said artificial intelligence module to determine whether any object detected in an image/video of one or more objects being scanned resembles an already known covert spying device;
   C) carry out a network scan process, in response to receiving said network scan option as said one or more user selections, by said artificial intelligence module to determine whether one or more network attributes associated with said one or more objects being scanned by said computing device resembles one or more network attributes associated with said already known covert spying device;
   D) carry out a monitoring process, in response to receiving said monitoring option as said one or more user selections, by said artificial intelligence module to determine any unauthorized access made to said computing device or to said one or more devices being monitored by said computing device based on one or more activities occurred in said computing device or in one or more devices being monitored by said computing device; and
   E) report any of said one or more objects as a suspected covert spying device on finding said resemblance with said already known covert spying device and/or finding said unauthorized access.

2. The system as in claim 1 wherein said suspected covert spying device is indicated by one or more indicators in said report.

3. The system as in claim 1 wherein one or more of said suspected covert spying devices are listed under one or more categories in said report as per a degree of probability of being said suspected covert spying device.

4. The system as in claim 1 wherein said artificial intelligence module uses machine learning for said image recognition process, for network scan process and for monitoring process.

5. The system as in claim 1 wherein said image recognition process comprising preparation of training data, creating a deep learning model, training said deep learning model as per said training data and evaluation of accuracy of said deep training model.

6. The system as in claim 1 wherein a user interface presented by said computing device provides one or more options for obtaining one or more additional information on said suspected covert spying device included in said report for further evaluation and verification.

7. The system as in claim 1 wherein said network attributes include a unique ID, a timestamp, a Media Access Control, a received signal strength indicator, one or more vendor details, an Access Point, and a Class of Device.

8. The system as in claim 2, wherein said one or more indicators of said report for said unauthorized access is a textual or audible message.

9. The system as in claim 1 wherein said determination of said unauthorized access involves an evaluation by said artificial intelligence module to determine any deviation in said one or more activities from a defined set of activities.

10. A system for detection of covert spying devices, said system comprising:
   a covert spying device detection system server comprising an artificial intelligence module and one or more processors, said one or more processors being programmed with computer program instructions that, when executed by said one or more processors, program said covert spying device detection system server to:
   a. interact with one or more computing devices to acquire an image or video and one or more network attributes associated with one or more objects being scanned;
   b. carry out an image recognition process by said artificial intelligence module to determine whether any object from said one or more objects found in said image or video resembles an already known covert spying device;
   c. carry out a network scan process by said artificial intelligence module to determine whether said one or more network attributes associated with said one or more objects being scanned resemble one or more network attributes associated with said already known covert spying device; and d. report any of said one or more objects as a suspected covert spying device on finding said resemblance with said already known covert spying device.

11. The system of claim 10 wherein said artificial intelligence module enables a user to obtain one or more additional information on said suspected covert spying device included in said report for further evaluation and verification.

12. The system of claim 10 wherein one or more of said suspected covert spying devices are listed under one or more categories in said report as per a degree of probability of being said suspected covert spying device.

13. The system of claim 12 wherein said one or more of said suspected covert spying device are indicated by one or more indicators in said report as per said degree of probability of being said suspected covert spying device.

14. The system of claim 13 wherein said one or more indicators comprise textual or audible messages.

15. The system of claim 10 wherein said covert spying device detection system server is further configured to carry out a monitoring process to determine any, unauthorized access made to said one or more computing devices or to said one or more objects being scanned based on evaluation of any deviation of one or more activities occurred in said one or more computing devices and/or in said one or more objects being scanned from a defined set of activities.

16. A method for detection of covert spying devices in a covert spying device detection system,
said covert spying device detection system comprising one or more computing devices and a covert spying device detection system server communicatively connected to said one or more computing devices, said method comprising the steps of:
A) acquiring data of an image or video and one or more network attributes associated with one or more objects being scanned by said one or more computing devices;
B) acquiring an image or video of and one or more network attributes associated with one or more objects being scanned by said one or more computing devices;
C) determining, by an artificial intelligence module included in said one or more computing devices or in said covert spying device detection system, whether any said object from said one or more objects found in said data resembles an already known covert spying device;
D) determining, by said artificial intelligence module, whether said one or more network attributes associated with said one or more objects resemble one or more network attributes associated with said already known covert spying device; and
E) reporting any of said one or more objects as a suspected covert spying device upon finding said resemblance with said already known covert spying device.

17. The method of claim 16, wherein said artificial intelligence module enables a user to obtain one or more additional information from said suspected covert spying device for further evaluation and verification.

18. The method of claim 16, wherein one or more of said suspected covert spying devices are listed under one or more categories in said reporting as per a degree of probability of being said suspected covert spying device.

19. The method of claim 18, wherein said one or more of said suspected covert spying devices are indicated by one or more indicators in said reporting as per said degree of probability of being said suspected covert spying device.

20. The method of claim 16, wherein said covert spying device detection system server and said one or more computing devices are further configured to carry out a monitoring process to determine any unauthorized access made to said one or more computing devices and to said one or more objects being scanned based upon evaluation of any deviation of one or more activities occurred in said one or more computing devices and in said one or more objects being scanned from a defined set of activities.

21. The method of claim 20 wherein said covert spying device comprises a hacked device.

22. The method of claim 16, wherein said covert spying device detection system server and said one or more computing devices are further configured to carry out a monitoring process to determine any unauthorized access made to said one or more computing devices or to said one or more objects being scanned based upon evaluation of any deviation of one or more activities occurred in said one or more computing devices or in said one or more objects being scanned from a defined set of activities.

23. The method of claim 22 wherein said covert spying device comprises a hacked device.

* * * * *